Dec. 23, 1952     C. A. WALTZ     2,622,829
FISHING ROD STAND
Filed Aug. 3, 1950
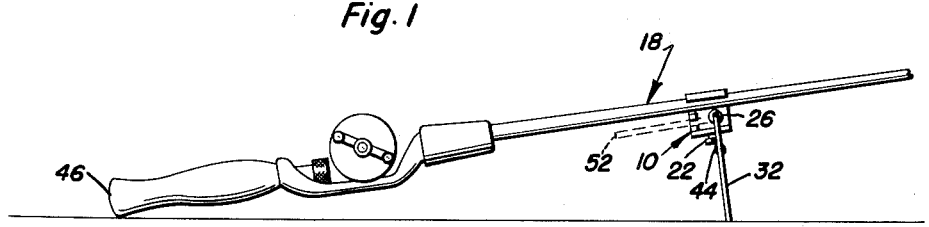
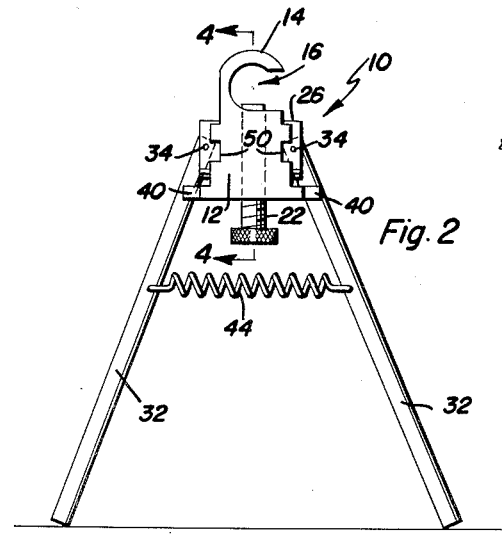
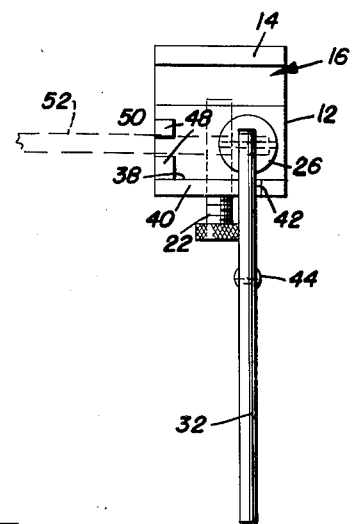
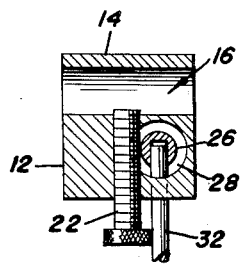
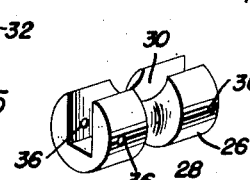
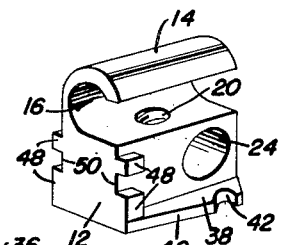
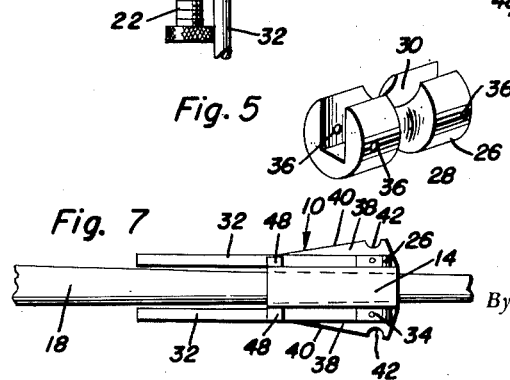
*Inventor*
Charles A. Waltz
By Clarence A. O'Brien
and Harvey B. Jacobson
*Attorneys*

Patented Dec. 23, 1952

2,622,829

UNITED STATES PATENT OFFICE 2,622,829

FISHING ROD STAND

Charles A. Waltz, Normal, Ill., assignor of fifty per cent to Henry A. Huff, Normal, Ill.

Application August 3, 1950, Serial No. 177,521

3 Claims. (Cl. 248—42)

This invention relates to new and useful improvements and structural refinements in stands for fishing rods, and the principal object of the invention is to conveniently and dependably support a fishing rod in an inclined, operative position, an important feature of the invention residing in the provision of means for folding the stand to an inoperative position, so that it may remain attached to the fishing rod in an inobtrusive manner.

Some of the advantages of the invention reside in its simplicity of construction, in its efficient and dependable operation, in its pleasing appearance, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention supporting a fishing rod;

Figure 2 is a front elevational view of the invention per se;

Figure 3 is a side elevational view thereof;

Figure 4 is a fragmentary sectional detail, taken substantially on the plane of the line 4—4 on Figure 2;

Figure 5 is a perspective view of a fulcrum member used in the invention;

Figure 6 is a perspective view of the block or body of the stand; and,

Figure 7 is a fragmentary top plan view of the subject shown in Figure 1, but illustrating the stand in its folded position.

Like characters of reference are employed to designate like parts in the specification and throughout the several views.

Referring now to the accompanying drawing in detail, the invention consists of a fishing rod stand which is designated generally by the reference character 10 and embodies in its construction a block shaped body 12 provided at the top thereof with a hooked shaped portion 14 which affords an open sided socket 16 for the reception of a fishing rod 18, as shown in Figure 1.

The block 12 is provided with a vertical, screw-threaded bore 20 to receive a clamping screw 22 which extends upwardly into the socket 16 to engage the fishing rod 18, whereby to firmly retain the entire stand in position on the fishing rod.

The block 12 is also provided with a transverse, cylindrical bore 24 to slidably and rotatably receive a cylindrical fulcrum member 26, this fulcrum member being provided intermediate the ends thereof with an annular groove 28 to accommodate the clamping screw 22 so that when the clamping screw is installed in the block, a longitudinal sliding or shifting of the fulcrum member 26 in the bore 24 is impossible.

The fulcrum member 26 is also provided with a longitudinally extending recess 30, and a pair of legs 32 have their upper end portions pivotally mounted in the opposite end portions of this recess by means of transverse pins 34 inserted in coaxial apertures 36 with which the fulcrum member 26 is formed.

It may be noted at this point that the legs 32 together with the fulcrum member 26 may be readily separated from the block 12, this being effected by simply removing the screw 22 and swinging one of the legs 32 to a position where it is co-axial with the fulcrum member 26 after which the fulcrum member and the leg which is co-axial therewith may be simply withdrawn from the bore 24.

In any event, it is to be noted that the block 12 is provided at the bottom thereof with a pair of laterally projecting flanges 38 which, in turn, are provided with forwardly divergent side edges 40 having notches 42 located substantially below the bore 24, these notches affording feet for the legs 32 when the device is in its operative position. A tension spring 44 extends between intermediate portions of the legs 32 for the purpose of the urging the same together and into the seats 42, it being noted that in this position, the legs 32 are downwardly diverging and co-act with the handle 46 at the end of the fishing rod 18 in substaining the fishing rod in a substantially inclined operative position.

The block 12 is also provided at the opposite sides thereof with pairs of vertically spaced lugs 48 which define therebetween a pair of notches or seats 50 disposed rearwardly from the bore 24, and when the use of the stand is not desired, the legs 32 may be drawn apart against the resiliency of the spring 44 so as to disengage the legs from the notches 42, after which the legs 32 may be swung rearwardly and upwardly while the member 26 rotates in the bore 24 until a position is reached where the spring 44 urges the two legs in the respective seats 50 between the lugs 48, as indicated by the phantom lines 52 in Figures 1 and 3 and by the full lines in Figure 7.

It is to be particularly noted that the transverse spacing of the notches 50 in the block 12 is such that when the legs 32 are disposed therein, the legs are substantially parallel with each other and with the fishing rod 18, so that the stand in its folded position is quite unobtrusive. However, when it is desired to erect the stand, the legs 32 are drawn apart against the action of the spring 44 and are moved out of the seats 50 to engage the divergent side edges 40 of the flanges 38, and then by simply swinging the legs forwardly, the legs will be drawn apart by the cam action of the flanges 38, until the legs again engage the seats 42 in the flanges and assume their downwardly divergent, operative position.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. A fishing rod stand comprising a block adapted to be attached to an intermediate portion of a fishing rod and provided with a transverse bore, a fulcrum member rotatably mounted in said bore and projecting outwardly therefrom, a pair of legs pivotally connected to the opposite ends of said member, and resilient means extending between said legs for urging the same together, said block being provided with pairs of transversely spaced notches to selectively receive said legs.

2. The device as defined in claim 1 wherein said block is provided with a fishing rod receiving socket, and a clamping screw provided in said block and extending into said socket whereby to secure the block to a fishing rod.

3. The device as defined in claim 2 wherein said clamping screw engages said fulcrum member to sustain the latter in said bore.

CHARLES A. WALTZ.

REFERENCES CITED

The following references are of record in the file of this patent:

UNITED STATES PATENTS

| Number | Name | Date |
|---|---|---|
| 374,737 | Geils | Dec. 13, 1887 |
| 1,534,642 | Hoagland | Apr. 21, 1925 |
| 2,502,684 | Ward | Apr. 4, 1950 |